(12) United States Patent
Chassagne et al.

(10) Patent No.: US 11,753,953 B2
(45) Date of Patent: Sep. 12, 2023

(54) HEAT EXCHANGER COMPRISING AN INTER-VANE WALL PROVIDED WITH HOLLOW TURBULENCE GENERATORS

(71) Applicant: SAFRAN AIRCRAFT ENGINES, Paris (FR)

(72) Inventors: Amélie Argie Antoinette Chassagne, Moissy-Cramayel (FR); Antoine Robert Alain Brunet, Moissy-Cramayel (FR); Cédric Zaccardi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/757,035

(22) PCT Filed: Dec. 8, 2020

(86) PCT No.: PCT/HR2020/052336
§ 371 (c)(1),
(2) Date: Jun. 8, 2022

(87) PCT Pub. No.: WO2021/116592
PCT Pub. Date: Jun. 17, 2021

(65) Prior Publication Data
US 2023/0010301 A1    Jan. 12, 2023

(30) Foreign Application Priority Data
Dec. 12, 2019   (FR) ........................................ 1914287

(51) Int. Cl.
*F01D 9/06*   (2006.01)
*F01D 9/04*   (2006.01)
(Continued)

(52) U.S. Cl.
CPC ............ *F01D 9/065* (2013.01); *F01D 9/041* (2013.01); *F01D 25/14* (2013.01); *F28F 13/12* (2013.01);
(Continued)

(58) Field of Classification Search
CPC .......... F01D 9/065; F01D 9/041; F01D 25/14; F28F 13/12; F28D 2021/0021;
(Continued)

(56) References Cited

U.S. PATENT DOCUMENTS 11,162,417 B2 *  11/2021  Qiu ........................... F02C 7/04
11,549,434 B2 *  1/2023   Zysman .................... F02C 7/18
(Continued)

FOREIGN PATENT DOCUMENTS

EP    3290846 A1    3/2018

OTHER PUBLICATIONS

International Search Report for issued in Application No. PCT/FR2020/052336 dated Apr. 15, 2021.
(Continued)

*Primary Examiner* — Igor Kershteyn
(74) *Attorney, Agent, or Firm* — Pearne & Gordon LLP

(57) ABSTRACT

An assembly for a turbomachine through which an air flow passes, includes a stator including guide vanes extending radially in relation to a longitudinal axis, at least one inter-vane platform extending between the radially outer ends of two circumferentially consecutive guide vanes, each inter-vane platform including an outer surface that faces the axis, a heat exchanger located downstream of the stator in relation to a direction of circulation of the air flow in the turbomachine during operation, this stator including a heat exchange surface extending in the extension of an inter-vane platform. At least one inter-vane platform located in the
(Continued)

upstream extension of the heat exchange surface is provided with at least one turbulence generator on its outer surface.

8 Claims, 3 Drawing Sheets

(51) Int. Cl.
  *F01D 25/14* (2006.01)
  *F28F 13/12* (2006.01)
  *F28D 21/00* (2006.01)

(52) U.S. Cl.
  CPC ............... *F28D 2021/0026* (2013.01); *F28D 2021/0089* (2013.01)

(58) Field of Classification Search
  CPC ..... F28D 2021/0026; F28D 2021/0089; F05D 2240/12; F05D 2240/127; F05D 2260/213; F05D 2260/2212; Y02T 50/60
  See application file for complete search history.

(56) References Cited

U.S. PATENT DOCUMENTS

| | | | |
|---|---|---|---|
| 11,619,169 B2* | 4/2023 | Weicker | F02C 7/18 165/154 |
| 2012/0114468 A1 | 5/2012 | Elder | |
| 2018/0058473 A1* | 3/2018 | Kenworthy | F28D 1/0246 |
| 2019/0360398 A1* | 11/2019 | Qiu | F02C 7/14 |
| 2021/0215055 A1* | 7/2021 | Germain | F01D 5/146 |

OTHER PUBLICATIONS

Written Opinion for PCT/FR2020/052336 dated Apr. 15, 2021.
Search Report issued in French Patent Application No. 1914287 dated Aug. 4, 2020.

* cited by examiner

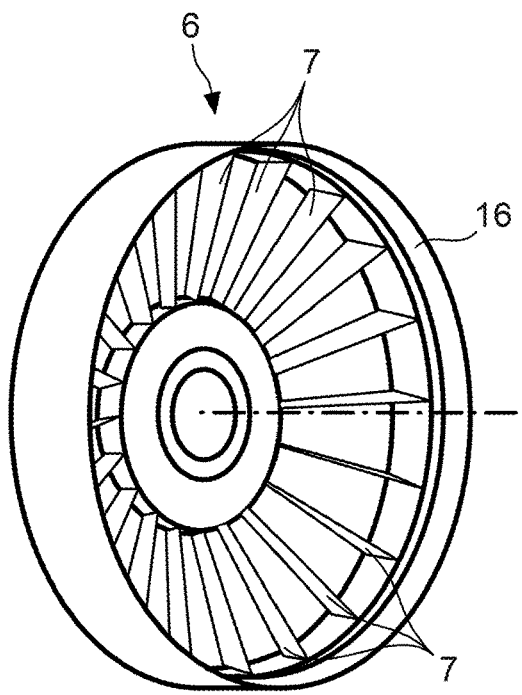
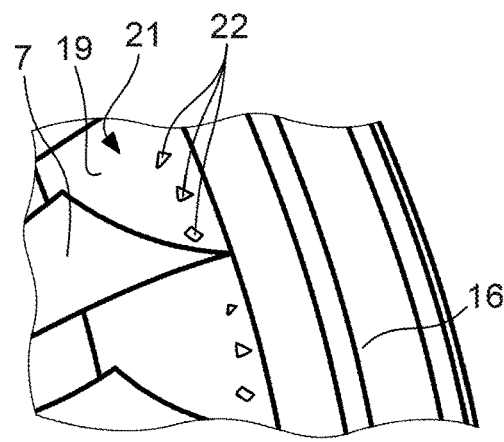
FIG. 6  FIG. 7
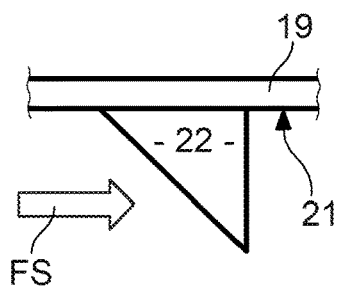 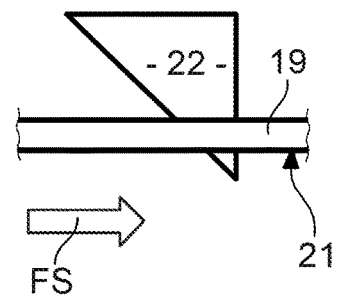
FIG. 8  FIG. 9
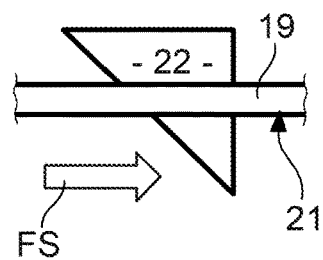
FIG. 10

HEAT EXCHANGER COMPRISING AN INTER-VANE WALL PROVIDED WITH HOLLOW TURBULENCE GENERATORS

This is the National Stage of PCT international application PCT/FR2020/052336, filed on Dec. 8, 2020 entitled "HEAT EXCHANGER COMPRISING AN INTER-VANE WALL PROVIDED WITH HOLLOW TURBULENCE GENERATORS", which claims the priority of French Patent Application No. 1914287 filed Dec. 12, 2019, both of which are incorporated herein by reference in their entireties.

TECHNICAL FIELD

The invention relates to a turbomachine such as a turbojet engine, through which at least one gas flow stream passes, this stream being delimited by an inner wall of this engine.

PRIOR ART

In such an engine, the air is admitted in an intake duct to pass through a fan including a series of rotary blades before splitting into a central primary flow and a secondary flow surrounding the primary flow.

The primary flow is compressed by compressors before reaching a combustion chamber, after which it expands by passing through turbines, before being released by generating a thrust. The secondary flow is for its part propelled directly by the fan to generate an additional thrust.

The primary flow and the secondary flow respectively circulate in a primary stream and a secondary stream separated from one another by a space called inter-stream.

The primary stream is externally delimited by an inner wall of the inter-stream space, the secondary stream is internally delimited by an outer wall of the inter-stream space and it is externally delimited by an inner wall of a nacelle surrounding the turbojet engine.

In such an engine, various components, of the bearings, gears and other type, are lubricated by oil that circulates in a hydraulic circuit integrating a heat exchanger, in the form of a cooling radiator, ensuring that this oil remains at an adapted temperature in all circumstances. Such an exchanger is usually designated by the acronym ACOC meaning "Air Cooled Oil Cooler", that is to say cooled by air and cooling the oil.

This exchanger is fastened to a wall of the jet engine, and it protrudes from this wall to be passed through by a portion of the flow that runs along this wall by circulating in the jet engine, in such a way as to cool the oil of the hydraulic circuit.

Such an exchanger thus constitutes a relief shape that in fact constitutes an obstacle introducing pressure losses in the flow in the engine.

The aim of the invention is to propose an arrangement integrating such an exchanger that limits the pressure losses that it introduces into the flow passing through this jet engine.

DISCLOSURE OF THE INVENTION

To this end, the object of the invention is an assembly for a turbomachine through which an air flow passes, comprising a stator including guide vanes extending radially in relation to a longitudinal axis, at least one inter-vane platform extending between the radially outer ends of two circumferentially consecutive guide vanes, each inter-vane platform including an outer surface that faces the axis, a heat exchanger located downstream of the stator in relation to the direction of circulation of the air flow, this stator including a heat exchange surface extending in the downstream extension of an inter-vane platform, and wherein at least one inter-vane platform located in the upstream extension of the heat exchange surface of the heat exchanger is provided with at least one turbulence generator on its outer surface.

The invention thus makes it possible to dispense with fins usually provided in such a heat exchanger, to obtain an optimal heat exchange efficiency while reducing the pressure loss introduced into the secondary flow by the presence of the exchanger.

The invention also relates to an assembly thus defined, wherein at least one inter-vane platform includes a plurality of turbulence generators distributed in at least one direction perpendicular to the longitudinal direction.

The invention also relates to an assembly thus defined including at least two adjacent turbulence generators having different shapes and/or dimensions.

The invention also relates to an assembly thus defined, including at least one turbulence generator that protrudes from the outer surface.

The invention also relates to an assembly thus defined, including at least one turbulence generator having a hollow shape in relation to the outer surface.

The invention also relates to an assembly thus defined, including at least one turbulence generator movable between a deactivated state wherein it is flush with the outer surface so as not to generate turbulences, and an activated state wherein it forms a relief in relation to the outer surface to generate turbulences.

The invention also relates to an assembly thus defined, integrating a system for controlling the activated or deactivated state of the turbulence generators.

Another object of the invention is a turbomachine including an assembly thus defined.

BRIEF DESCRIPTION OF THE DRAWINGS

FIG. 6 is a perspective view showing a stator with its heat exchanger;

FIG. 7 is a perspective view locally showing a heat exchanger according to the invention mounted downstream of guide vanes;

FIG. 8 is a schematic sectional view of a variable-geometry turbulence generator in the activated state;

FIG. 9 is a schematic sectional view of a variable-geometry turbulence generator in the deactivated state.

FIG. 10 is a schematic sectional view of a variable-geometry turbulence generator in the partially activated state.

DETAILED DISCLOSURE OF THE INVENTION

Figure 1:
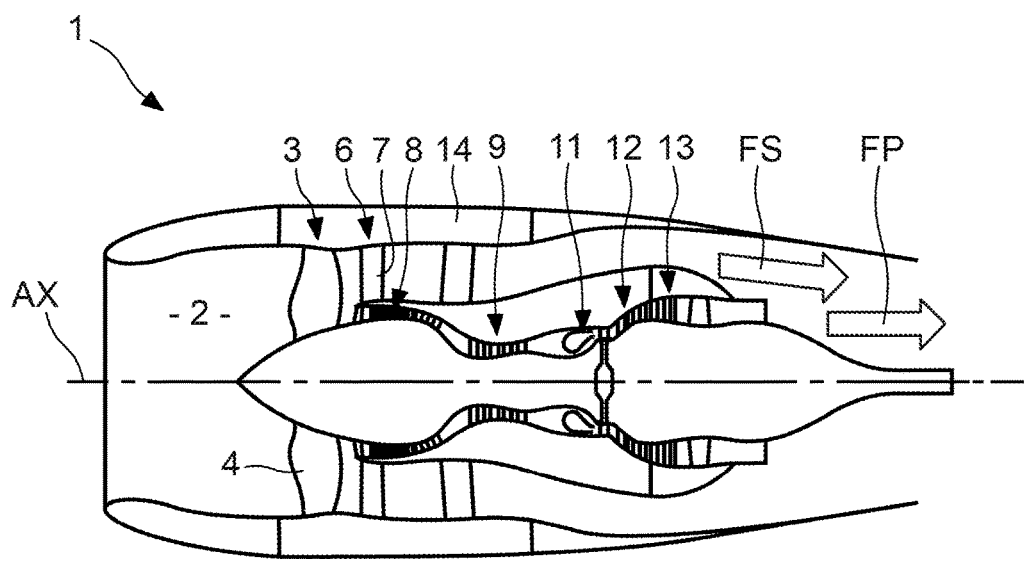
FIG. 1 is a longitudinal sectional view of a turbojet engine according to the invention.

In FIG. 1, an engine 1 includes an intake duct 2 through which the air is admitted to pass through a fan 3 including a series of rotary blades 4 followed by a stator 6 formed of guide vanes 7 before splitting into a central primary flow FP and a secondary air flow FS surrounding the primary flow.

The primary flow FP is compressed by low-pressure 8 and high-pressure 9 compressors before reaching a combustion chamber 11, after which it expands by passing through a high-pressure turbine 12 and a low-pressure turbine 13, before being released by generating an auxiliary thrust. The secondary flow FS is for its part propelled directly by the fan to generate a main thrust.

Each turbine 12, 13 includes series of vanes radially oriented and evenly spaced about a longitudinal axis AX, an outer casing 14 surrounding the whole engine.

The engine 1 integrates a circuit for circulating lubricating oil and/or for cooling its components, such as the bearings carrying its rotary elements or transmission members that this engine integrates. The cooling of this oil is ensured by the secondary flow that is cool, by means of a heat exchanger.

Figure 2:
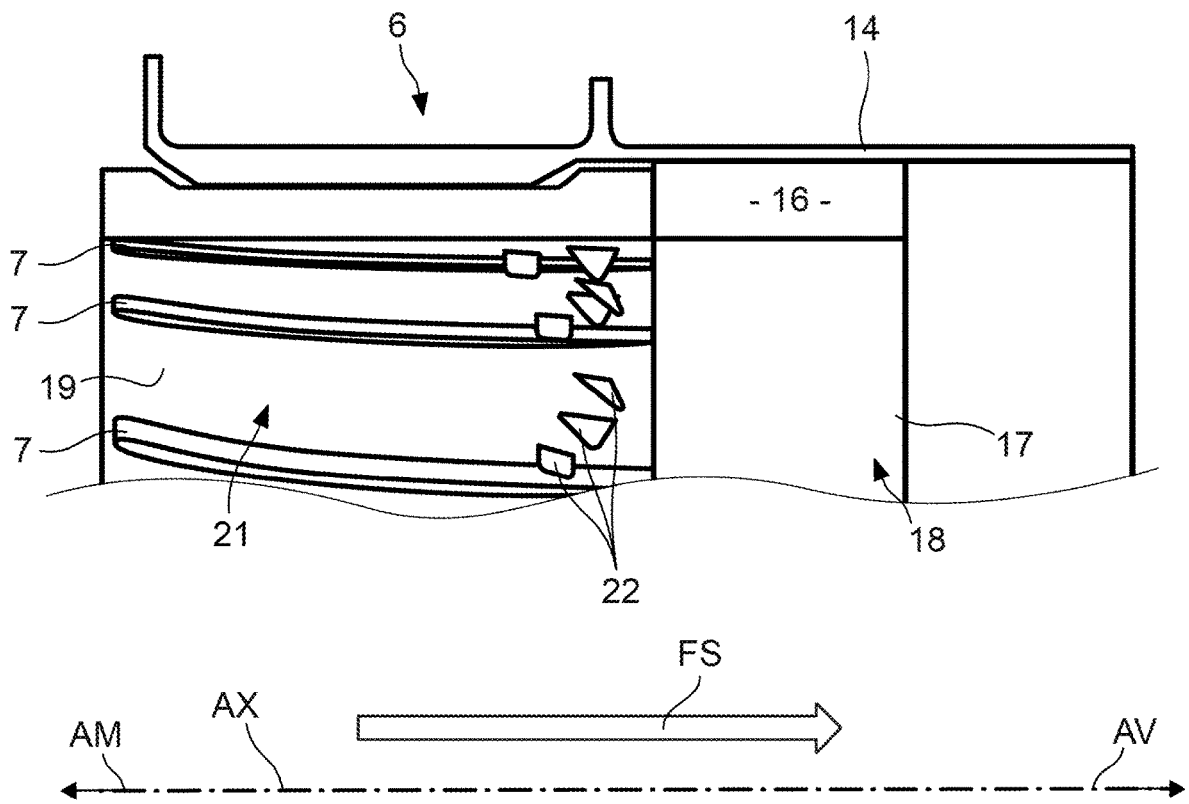
FIG. 2 is a local longitudinal sectional view of the turbojet engine according to the invention at a heat exchanger.

This exchanger, referenced by 16 in FIG. 2, is carried by an inner shell of the outer casing 14 substantially downstream of the guide vanes 7, and it includes a heat exchange wall 17 having a heat exchange surface 18, radially inner, which is bathed by the secondary flow FS in order to be cooled by it. This exchange surface 18 is advantageously devoid of any relief so as not to disrupt the secondary flow.

This exchanger 16 includes inner pipes not shown wherein the oil to be cooled circulates, and which are thermally connected to the wall 17 to cool the oil circulating in these pipes.

As seen in FIGS. 2 and 7, the guide vanes 7 of the stator 6 extend radially in relation to the longitudinal axis AX, and an inter-vane platform 19 extends between the radially outer ends of each pair of circumferentially consecutive guide vanes 7. Each inter-vane platform 19 thus includes a surface 21, called outer, which faces the axis AX, along which the air flow circulating in the turbojet engine runs.

Each inter-vane platform 19 is for example the extension of one of the two vanes between which it extends by being rigidly connected to it to form with it a complete single-piece.

The heat exchange surface 18 of the exchanger 16 is located in the extension, downstream AV in relation to the direction of circulation of the flow FS, of one or more outer surfaces of the inter-vane platforms 19. According to the invention, at least one outer surface 21 located in the extension of the exchanger 16 is provided with turbulence generators 22. The outer surface 21 of this platform 19 thus makes it possible to locally introduce turbulences into the secondary flow FS that runs along it, in order to increase the efficiency of the heat exchange between this primary flow and the exchange wall 17 located immediately downstream of it.

Figure 3:
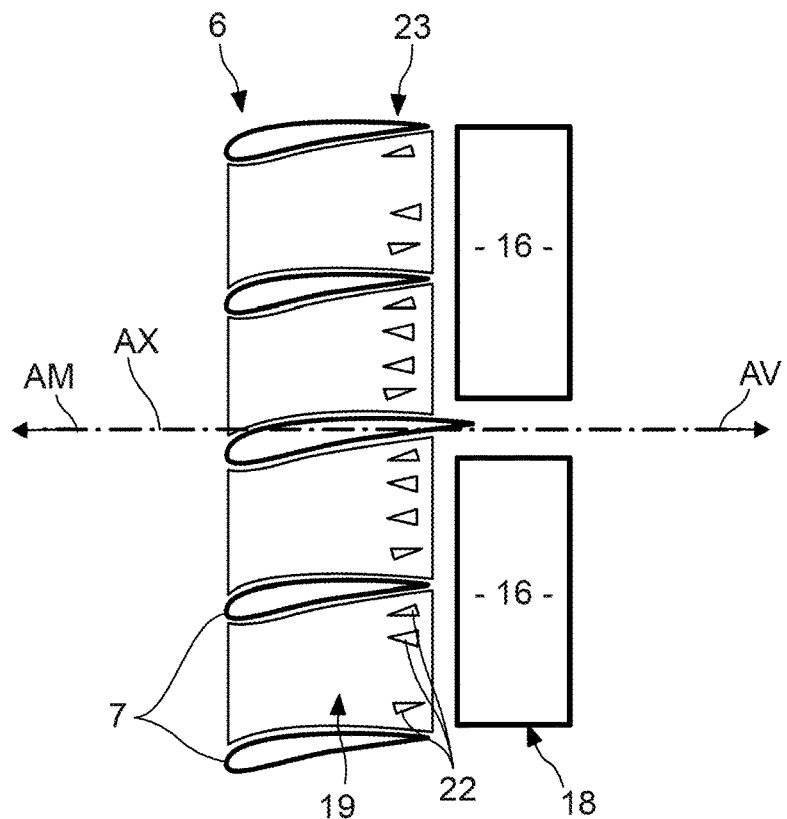
FIG. 3 is a local flat radial view of the turbojet engine according to the invention showing two heat exchangers mounted downstream of the fan stator.

As seen in FIG. 3, the engine 1 may include a plurality of heat exchangers 16 placed on the inner circumference of the casing 14, by being circumferentially spaced apart from one another and located longitudinally immediately downstream of the stator 6.

In the examples of the figures, the turbulence generators 22 are relief shapes protruding from the outer surface 21, to locally deviate the secondary flow in order to introduce therein turbulences. The flow then running along the exchange surface 18 located downstream of these turbulence generators is therefore turbulent, which significantly increases its heat exchanges with the surface 18, to cool the oil of the exchanger 16 more efficiently and by minimally disrupting the overall flow of the secondary flow FS.

The turbulence generators 22 advantageously have different dimensions, in relation to one another, to maximise the turbulences that they introduce. Advantageously, a plurality of turbulence generators 22 are arranged one behind the other in the longitudinal direction.

Figure 4:
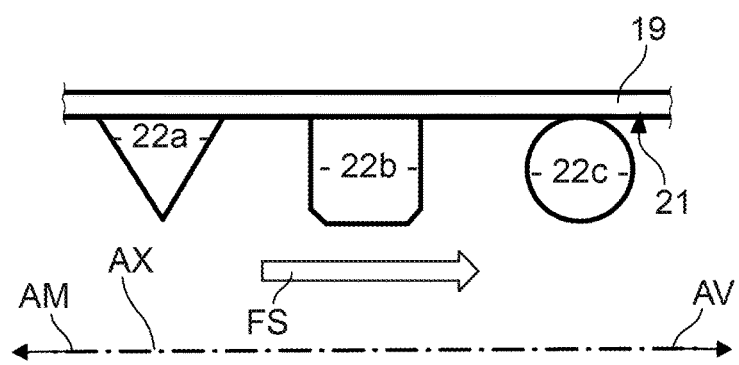
FIG. 4 is a longitudinal sectional view of a shape of hollow turbulence generator.
Figure 5:
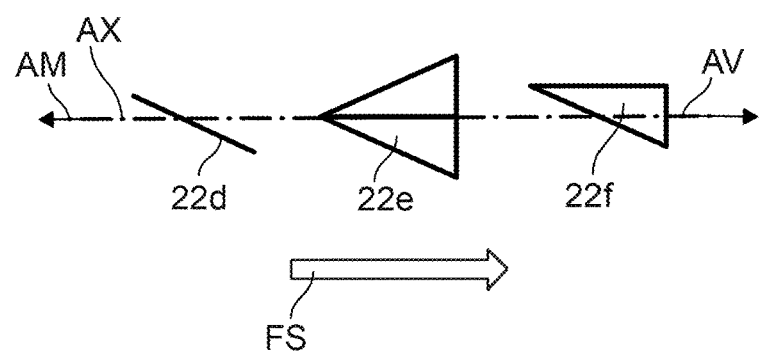
FIG. 5 is a schematic sectional view of a profile showing a plurality of examples of shapes of turbulence generators.

The turbulence generators 22 may also have various shapes, as schematically illustrated in FIGS. 4 and 5. This may for example concern fin shapes protruding from the surface 21 by being inclined in relation to the direction AX as schematically illustrated by the fin 22*d* in FIG. 5. Such a fin may have in lateral view a triangular contour like the fin 22*a*, rectangular like the fin 22*b*, or even circular like the fin 22*c*, these examples being schematically shown in FIG. 4.

These generators may also have a volumetric shape like an isosceles triangle-based pyramid shape in the case of the generator 22*e* or also a right-angled triangle-based pyramid shape like in the case of the generator 22*f* that are schematically shown in FIG. 5. Other shapes, more or less complex than those shown in FIGS. 4 and 5 may also be envisaged.

Generally, the turbulence generators 22 have a height significantly less than the stream height in the radial direction. This height is the difference in radius between the inner surface of the casing 14, which externally delimits the secondary flow, and the outer surface of a casing internally delimiting the secondary flow. The length of these turbulence generators is for its part between one tenth and ten times this height.

The inclination of the leading edge of a turbulence generator in relation to the surface 21 is advantageously between 10° and 90°, and the inclination of the trailing edge or of its downstream surface in relation to the surface 21 is advantageously between 90° and 60°. When such a turbulence generator is a fin, its thickness is advantageously less than one tenth of its length in the direction AX.

Generally, various shapes may be provided, from the simplest to the most complex, and the shapes as well as the dimensions of these generators 22 are determined by the expected heat exchange level and the acceptable pressure loss.

These generators may be distributed in the circumferential direction, that is to say in the direction perpendicular to the axis AX, and in the longitudinal direction AX uniformly or heterogeneously. Advantageously, the various turbulence generators 22 have different shapes and different dimensions, so as to increase the turbulence that they generate.

In the example of the figures the turbulence generators 22, 22*a-f* have relief shapes protruding from the surface 21, but it is possible, alternatively or additionally to provide generators having hollow shapes formed in the surface 21, in order to, similarly locally generate turbulences in the flow of fluid running along the surface 21.

In order to optimise the heat exchange depending on the operating conditions of the engine, a system for controlling the generators 22, that may be active or passive, is advantageously provided to extend them or retract them. The turbulence generators 22 are therefore retractable in order to be activated or deactivated as required, which makes it possible to substantially eliminate the pressure loss when the required cooling is low or zero, for example during cold weather.

In practice, the system is thus activated to extend the turbulence generators 22 so that they protrude from the surface 21, as in FIG. 8 in order to obtain a significant cooling, to the detriment of a relatively high pressure loss. This system is deactivated to retract the generators 22 as in FIG. 9 in order to obtain a low or zero cooling, but a non-existent pressure loss.

As illustrated in FIG. 10, the control system may also be arranged to place the turbulence generators in a partially extended state, in order to obtain a moderate cooling, accompanied with a low pressure loss.

Within this scope, the control system is then configured to activate in order to place the disrupters in an extended state in the event of failure or operating anomaly of the engine, in such a way as to then guarantee a maximum cooling.

What is claimed is:

1. An assembly for a turbomachine through which an air flow passes, comprising a stator comprising guide vanes extending radially in relation to a longitudinal axis, at least one inter-vane platform extending between the radially outer ends of two circumferentially consecutive guide vanes, each inter-vane platform including an outer surface that faces the axis, a heat exchanger located downstream of the stator in relation to the direction of circulation of the air flow, this stator including a heat exchange surface extending in the downstream extension of an inter-vane platform, and wherein at least one inter-vane platform located in the upstream extension of the heat exchange surface of the heat exchanger is provided with at least one turbulence generator on its outer surface.

2. The assembly according to claim 1, wherein at least one inter-vane platform includes a plurality of turbulence generators distributed in at least one direction perpendicular to the longitudinal direction.

3. The assembly according to claim 1, including at least two adjacent turbulence generators having different shapes and/or dimensions.

4. The assembly according to claim 1, including at least one turbulence generator that protrudes from the outer surface.

5. The assembly according to claim 1, including at least one turbulence generator having a hollow shape in relation to the outer surface.

6. The assembly according to claim 1, including at least one turbulence generator movable between a deactivated state wherein it is flush with the outer surface so as not to generate turbulences, and an activated state wherein it protrudes from the outer surface to generate turbulences.

7. The assembly according to claim 1, integrating a system for controlling the activated or deactivated state of the turbulence generators.

8. A turbomachine including the assembly according to claim 1.

* * * * *